US012800427B2

(12) United States Patent
Chung et al.

(10) Patent No.: US 12,800,427 B2
(45) Date of Patent: Nov. 17, 2026

(54) SENSOR CLEANING SYSTEM AND METHOD OF DIAGNOSING FAILURE THEREOF

(71) Applicants: HYUNDAI MOTOR COMPANY, Seoul (KR); KIA CORPORATION, Seoul (KR)

(72) Inventors: Hyong Do Chung, Seoul (KR); Sang Jun Ahn, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 356 days.

(21) Appl. No.: 18/603,362

(22) Filed: Mar. 13, 2024

(65) Prior Publication Data

US 2025/0116568 A1 Apr. 10, 2025

(30) Foreign Application Priority Data

Oct. 6, 2023 (KR) ........................ 10-2023-0133255

(51) Int. Cl.
*G01M 3/32* (2006.01)
*B60S 1/54* (2006.01)
*B60S 1/56* (2006.01)

(52) U.S. Cl.
CPC ............. *G01M 3/3263* (2013.01); *B60S 1/54* (2013.01); *B60S 1/56* (2013.01)

(58) Field of Classification Search
CPC ........... B60S 1/54; B60S 1/56; G01M 3/3263; B60R 16/02; B60R 16/08; F04B 39/00; F04B 41/02; B60Y 2306/15; B60Y 2400/302; B60Y 2400/306
See application file for complete search history.

(56) References Cited

U.S. PATENT DOCUMENTS

| | | | | |
|---|---|---|---|---|
| 2018/0015907 A1* | 1/2018 | Rice | .......................... | B60S 1/56 |
| 2018/0290632 A1* | 10/2018 | Rice | .......................... | B60S 1/56 |
| 2022/0306049 A1* | 9/2022 | Badanov | ............... | B05B 7/0815 |
| 2023/0182689 A1 | 6/2023 | Yang | | |
| 2024/0412570 A1* | 12/2024 | Lee | .......................... | B60S 1/54 |

FOREIGN PATENT DOCUMENTS

| | | |
|---|---|---|
| KR | 20230090655 A | 6/2023 |

* cited by examiner

*Primary Examiner* — Christopher W Carter

(74) *Attorney, Agent, or Firm* — Lempia Summerfield Katz LLC

(57) ABSTRACT

A sensor cleaning system includes an air tank connected to a compressor through a first connector and to be filled with high-pressure air by the compressor. The system also has a roof module and a rear bumper module. The system includes an air flow path connected to the air tank and branched by a second connector to a first branched air flow path and a second branched air flow path. The first branched air flow path is connected through a third connector to the roof module and the second branched air flow path is connected through a fourth connector to the rear bumper module. The system also includes a pressure sensor installed on each of the air tank, the roof module, and the rear bumper module to detect pressures thereof. The system also includes a controller configured to determine connection states of the first connector, the second connector, the third connector, and the fourth connector through a difference in pressures.

15 Claims, 10 Drawing Sheets

SENSOR CLEANING SYSTEM AND METHOD OF DIAGNOSING FAILURE THEREOF

CROSS-REFERENCE TO RELATED APPLICATION

This application claims under 35 U.S.C. § 119 (a) the benefit of priority to Korean Patent Application No. 10-2023-0133255, filed on Oct. 6, 2023, the entire contents of which are incorporated herein by reference.

BACKGROUND

(a) Technical Field

The present disclosure relates to a sensor cleaning system and a method of diagnosing a failure thereof. More specifically, the present disclosure relates to a sensor cleaning system and a method of diagnosing a failure thereof using a difference in pressures.

(b) Background Art

In general, autonomous driving vehicles or vehicles equipped with a driving assistance apparatus automatically control driving to a destination or assist a driver using GPS position information and signals acquired from a plurality of sensors based on road map information to make safe driving possible.

Therefore, since it is very important to correctly recognize objects around the vehicle in order to safely perform autonomous driving or assist the driver in driving the vehicle, securing the performance of sensors is required.

Typically, when foreign substances obstruct a sensor, the performance of the sensor is degraded. This degradation poses a safety risk for autonomous driving, and thus it is common to transfer driving control authority to the driver or perform sensor cleaning. Such sensor cleaning methods include using a physical wiper, using (washer cleaning) water or washing liquid pressure, using (air cleaning) air pressure, or the like.

SUMMARY

The present disclosure is directed to providing a sensor cleaning system and a method of diagnosing a failure thereof, which may correctly diagnose a location or position of the occurrence of a failure such as a leak. This is achieved by checking a connection state of each of an air tank, a rear bumper module, and a roof module to a connector using a difference in pressures detected from mounted pressure sensors when a compressor is driven. Additionally, this is achieved by diagnosing the presence or absence of a leak when each pressure sensor is mounted on the air tank, the rear bumper module, and the roof module and high-pressure air supplied from the air tank is distributed to the rear bumper module and the roof module to perform cleaning.

A sensor cleaning system according to one embodiment of the present disclosure includes an air tank connected to a compressor through a first connector and configured to be filled with high-pressure air by the compressor. The system also includes a roof module and a rear bumper module. The system also includes an air flow path that is connected to the air tank and is branched by a second connector to a first branched air flow path and to a second branched air flow path. The first branched air flow path is connected through a third connector to the roof module and the second branched air flow path is connected through a fourth connector to the rear bumper module. The system also includes a pressure sensor installed on and configured to measure or detect a pressure of each of the air tank, the roof module, and the rear bumper module. The system also includes a controller configured to determine connection states of the first connector, the second connector, the third connector, and the fourth connector through a difference in pressures between the air tank, the roof module, and the rear bumper module.

The controller may determine whether a leak according to the connection states of the first connector to the fourth connector occurs by using a difference in pressures between the air tank and the rear bumper module, between the roof module and the rear bumper module, and between the air tank and the rear bumper module when it is determined that a pressure is not consecutively increased in a state of the compressor being driven.

The controller may determine that a leak has occurred in the first connector when it is determined that each difference in pressure between the air tank and the rear bumper module, between the roof module and the rear bumper module, and between the air tank and the roof module is smaller than a set reference pressure difference.

In addition, the controller may determine that a leak has occurred in the second connector when it is determined that: i) the first connector is normal; ii) a difference in pressure between the air tank and the rear bumper module and a difference in pressure between the air tank and the roof module exceed the set reference pressure difference; and iii) an absolute value of the difference in pressure between the rear bumper module and the roof module is smaller than the set reference pressure difference.

In addition, the controller may determine that a leak has occurred in the third connector when it is determined that the first connector and the second connector are normal and that a pressure detected from the roof module is relatively lower than a pressure detected from the rear bumper module. Additionally, the controller may determine that a leak has occurred in the fourth connector when it is determined that the pressure detected from the roof module is relatively higher than the pressure detected from the rear bumper module.

The sensor cleaning system according to the first embodiment of the present disclosure may further include an outside air temperature sensor configured to measure an outside air temperature of a vehicle and to detect a change in the outside air temperature.

The controller may determine that a fine leak has occurred when it is determined that the change in outside air temperature transmitted from the outside air temperature sensor is within a set range and the compressor is driven a set number of times or more within a set time when a distributor configured to allow air to be distributed from the roof module and the rear bumper module is blocked.

In addition, the controller may determine that the first and second branched air flow paths connected to the roof module and the rear bumper module are in a stuck state when it is determined that a drop in pressure is not detected from the pressure sensors after air is distributed to the roof module and the rear bumper module.

The controller may determine all changes in pressures of the rear bumper module and the roof module and may individually diagnose stuck states of all the air flow paths connected to the roof module and the rear bumper module.

The controller may determine that the first and second branched air flow paths are in the stuck state when it is determined that the measured change in pressure between the rear bumper module and the roof module is smaller than a set critical value. Additionally, the controller may control the pressure sensors to measure or detect the pressures of the rear bumper module and the roof module for determining the change in pressure to be performed after a set idle time has elapsed.

A method of diagnosing a failure of a sensor cleaning system according to another embodiment of the present disclosure includes a first operation of determining, by a controller, whether a compressor is driven. The method also includes a second operation of determining, by the controller, a leak of a first connector, a second connector, a third connector, and/or a fourth connector installed in air flow paths connecting an air tank, a cowl crossbar, a roof module, and a rear bumper module through a difference in pressures between the air tank and the rear bumper module, between the roof module and the rear bumper module, and between the air tank and the rear bumper module when it is determined that a pressure is not consecutively increased when the compressor is driven.

The second operation may include determining that a leak has occurred in the first connector when it is determined that each difference in pressure between the air tank and the rear bumper module, between the roof module and the rear bumper module, and between the air tank and the roof module is smaller than a set reference pressure difference.

In addition, the second operation may include determining that a leak has occurred in the second connector when it is determined that: i) the first connector is normal; ii) a difference in pressure between the air tank and the rear bumper module, and a difference in pressure between the air tank and the roof module exceed the set reference pressure difference; and iii) an absolute value of the difference in pressure between the rear bumper module and the roof module is smaller than the set reference pressure difference.

In addition, the second operation may include determining that a leak has occurred in the third connector when it is determined that the first connector and the second connector are normal and that a pressure detected from the roof module is relatively lower than a pressure detected from the rear bumper module. The second operation may further include determining that a leak has occurred in the fourth connector when it is determined that the pressure detected from the roof module is relatively higher than the pressure detected from the rear bumper module.

In addition, the second operation may include determining that a fine leak has occurred when it is determined that: i) the change in outside air temperature transmitted from the outside air temperature sensor is within a set range; and ii) the compressor is driven a set number of times or more within a set time when a distributor configured to allow air to be distributed from the roof module and the rear bumper module is blocked.

A method of diagnosing a failure of a sensor cleaning system according to another embodiment of the present disclosure includes a first operation of diagnosing, by a controller, that an air flow path is primarily stuck when it is determined that a drop in pressure is not detected from each pressure sensor after air is distributed to a rear bumper module and a roof module in a stopped state of a vehicle. The method also includes a second operation of measuring a pressure by allowing air to be distributed to a first sensor connected to a respective first channel among a plurality of channels in either the rear bumper module or the roof module that are diagnosed to be primarily stuck. The second operation further includes comparing the measured pressures by allowing the air to be distributed to a second sensor connected to a respective second channel among the plurality of channels in either the rear bumper module or the roof module, by the controller. The method also includes a third operation of finally diagnosing, by the controller, a stuck state of the second channel when it is determined that changes in pressures of the first sensor and the second sensor in either the rear bumper module or the roof module are smaller than a set critical value.

The third operation may include determining all changes in pressures in the plurality of channels connected to the plurality of sensors of either the rear bumper module or the roof module and individually diagnosing stuck states of all the channels connected to the plurality of sensors of either the rear bumper module and the roof module.

The second operation may include measuring a pressure of the first sensor and measuring a pressure of the second sensor after a set idle time has elapsed when consecutively measuring pressures by allowing air to be distributed to the first sensor or the second sensor, and comparing the pressures.

According to the present disclosure, it is possible to correctly diagnose the position of the occurrence of a failure such as a leak by checking the connecting state of each of the air tank, the rear bumper module, and the roof module to the connector using the difference in the pressure detected from the mounted pressure sensors when the compressor is driven. Additionally, this is achieved by diagnosing the presence or absence of a leak with each pressure sensor mounted on the air tank, the rear bumper module, and the roof module and when high-pressure air supplied from the air tank is distributed to the rear bumper module and the roof module to perform cleaning.

In addition, according to the present disclosure, even though the outside air temperature is not changed and the high-pressure cleaning air is not distributed, when the compressor is operated to maintain the internal pressure to be the set minimum pressure or higher, it may be diagnosed that a fine leak has occurred. As a result, it is possible to effectively determine whether the fine leak occurs.

In addition, according to the present disclosure, after the cleaning air is distributed to the rear bumper module and the roof module, when it is determined that a drop in pressure has not been detected from the pressure sensor, it may be determined that the spray nozzle connected to the rear bumper module and the roof module is in the stuck state. As a result, it is possible to diagnose the presence or absence of the stuck state, i.e., is clogged, blocked, partially blocked, or the like.

It should be understood that the terms "vehicle" or "vehicular" or other similar term as used herein are inclusive of motor vehicles in general. Such motor vehicles may encompass passenger automobiles including sports utility vehicles (SUVs), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, e.g., a vehicle powered by both gasoline and electricity.

The above and other features of the present disclosure are discussed below.

BRIEF DESCRIPTION OF THE DRAWINGS

The above and other features of the present disclosure are described in detail with reference to certain examples thereof illustrated in the accompanying drawings, which are given hereinbelow by way of illustration only, and thus are not limitative of the present disclosure, and wherein.

Figure 1:
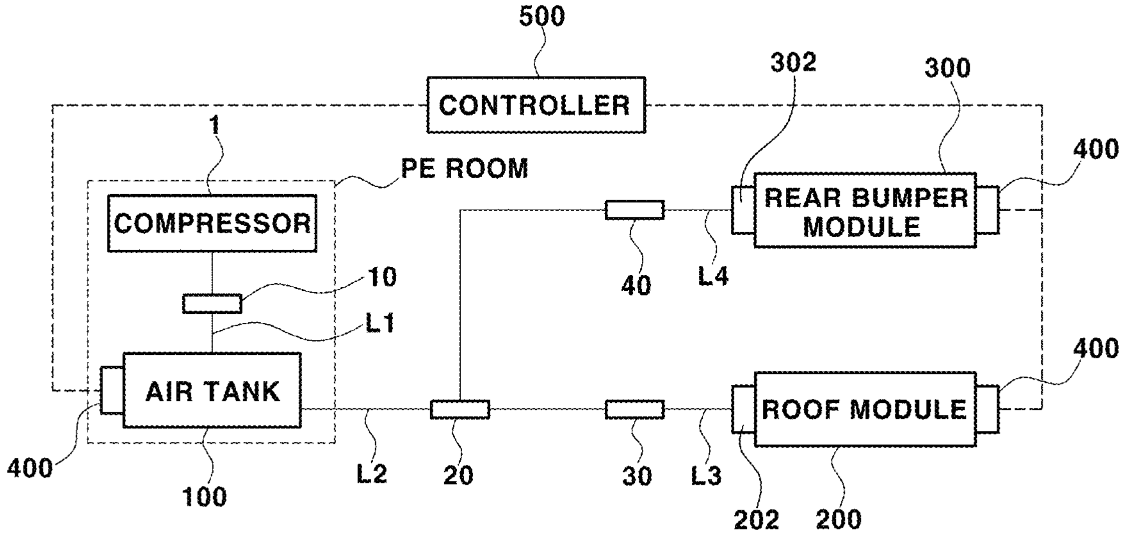
FIG. 1 is a schematic view illustrating a sensor cleaning system according to an embodiment of the present disclosure.

It should be understood that the appended drawings are not necessarily drawn to scale, and thus present a somewhat simplified representation of various features illustrative of the basic principles of the present disclosure. The specific design features of the present disclosure as described herein, including, for example, specific dimensions, orientations, locations, and shapes should be determined in section by the particular intended application and use environment.

In the figures, reference numbers refer to the same or equivalent sections of the present disclosure throughout the several figures of the drawing.

DETAILED DESCRIPTION

Hereinafter, embodiments according to the present disclosure are described in detail with reference to the accompanying drawings.

Advantages and features of the present disclosure and methods for achieving them should become clear with reference to the embodiments described below in detail in conjunction with the accompanying drawings.

When a controller, component, device, element, part, unit, module, or the like of the present disclosure is described as having a purpose or performing an operation, function, or the like, the controller, component, device, element, part, unit, or module should be considered herein as being "configured to" meet that purpose or perform that operation or function. Each controller, component, device, element, part, unit, module, and the like may separately embody or be included with a processor and a memory, such as a non-transitory computer-readable media, as part of the apparatus However, the present disclosure is not limited to the embodiments disclosed below and may be implemented in various different forms. The embodiments are merely provided to make the disclosure of the present disclosure complete and to fully inform those having ordinary skill in the art to which the present disclosure pertains the scope of the present disclosure. Additionally, the present disclosure is only defined by the scope of the appended claims.

In addition, in the description of the present disclosure, where it has been determined that related known technologies may have obscured the gist of the present disclosure, a detailed description thereof has been omitted.

Figure 2:
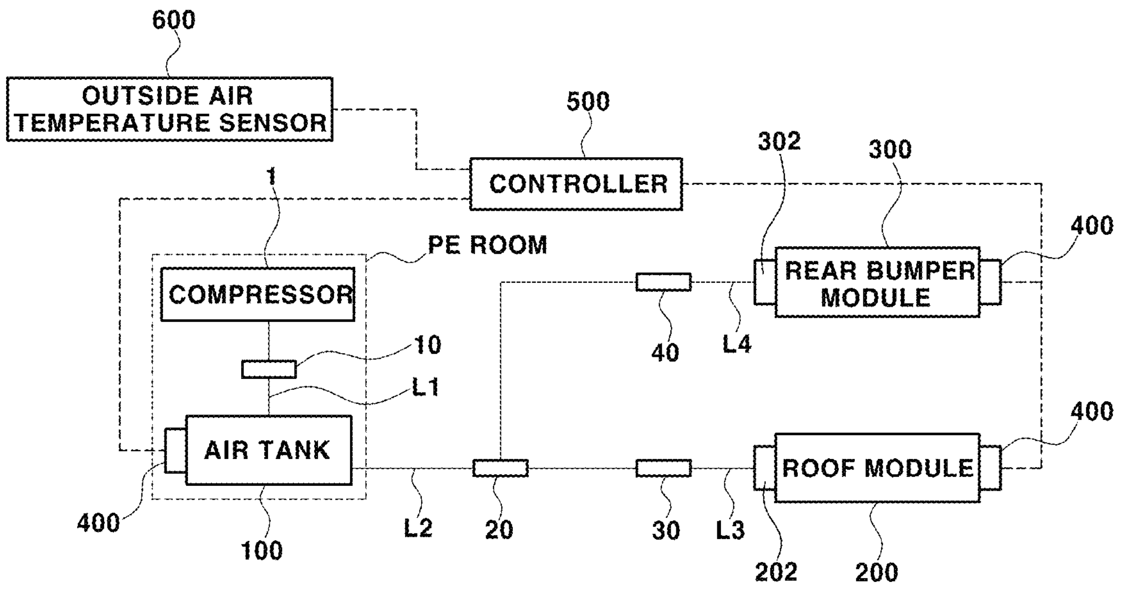
FIG. 2 is a schematic view illustrating an outside air temperature sensor of a sensor cleaning system according to an embodiment of the present disclosure.

FIG. 1 is a schematic view illustrating a sensor cleaning system according to an embodiment of the present disclosure. FIG. 2 is a schematic view illustrating an outside air temperature sensor of the sensor cleaning system according to an embodiment of the present disclosure.

In addition, FIGS. 3A-3E are charts illustrating the trend of changes in pressures of an air tank, a roof module, and a rear bumper module when a leak of the sensor cleaning system according to an embodiment of the present disclosure is determined. FIG. 4 is a chart illustrating the trend of a change in pressure when it is determined that the sensor cleaning system according to an embodiment of the present disclosure is stuck.

As illustrated in FIG. 1, the sensor cleaning system according to the present embodiment includes an air tank 100, a roof module 200, a rear bumper module 300, pressure sensors 400, and a controller 500.

The air tank 100 is formed to be filled with high-pressure air through an air flow path L1 by a compressor 1 driven by being connected through a first connector 10.

In other words, the air tank 100 is disposed in a power electric (PE) compartment provided at a front side of a body of a vehicle together with the compressor 1. The air tank 100 is configured to be filled with high-pressure air by the compressor 1. Thus, the air tank 100 is connected to the compressor 1 through the first connector 10 provided along the air flow path L1.

In addition, the roof module 200 and the rear bumper module 300 are respectively disposed along air flow paths L3 (i.e., a first branched air flow path) and L4 (i.e., a second branched air flow path formed by being branched from the air flow path L2 connected to the air tank 100 through a second connector 20.

More specifically, the roof module 200 and the rear bumper module 300 are connected to the branched air flow paths L3 and L4 formed by being branched, respectively, from the second connector 20 through a third connector 30 and a fourth connector 40. High-pressure cleaning air is distributed through the branched air flow paths L3 and L4.

The roof module 200 and the rear bumper module 300 include a plurality of sensors for autonomous driving. The sensors may include, for example, a radio detecting and ranging (radar), a light detection and ranging (LiDAR), a camera, and the like. Additionally, high-pressure air flowing through each of the first and second branched air flow paths L3 and L4 sprays to the sensors to perform cleaning.

The roof module 200 and the rear bumper module 300 are each connected to the plurality of sensors through a plurality of channels. Individual cleaning by spraying fluid (e.g. air or the like) is performed selectively by the control of a distributor 202, 302 using the controller 500.

A pressure sensor 400 is installed in each of the air tank 100, the roof module 200, and the rear bumper module 300 to measure respective pressures.

The controller 500 determines a difference in pressures between the air tank 100, the roof module 200, and the rear bumper module 300. The controller 500 also determines the connection states of the first connector 10, the second connector 20, the third connector 30, and the fourth connector 40 based on the differences in pressure between the air tank 100, the roof module 200, and the rear bumper module 300.

Figure 3A:
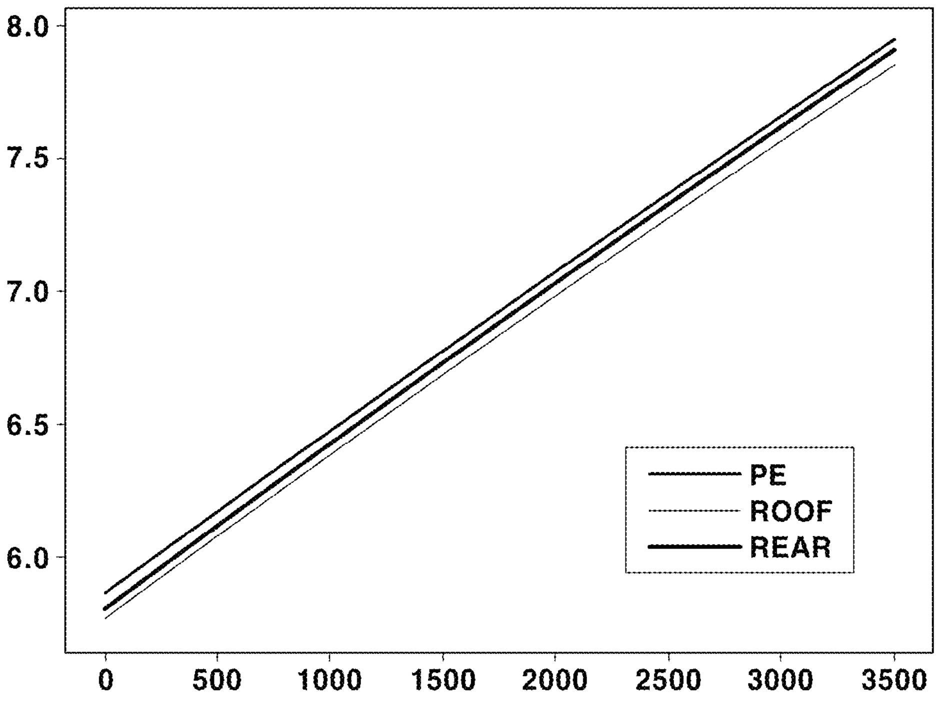
FIGS. 3A-3E are charts illustrating a trend of a change in pressure of an air tank, a roof module, and a rear bumper module when a leak of a sensor cleaning system according to an embodiment of the present disclosure is determined.
Figure 4:
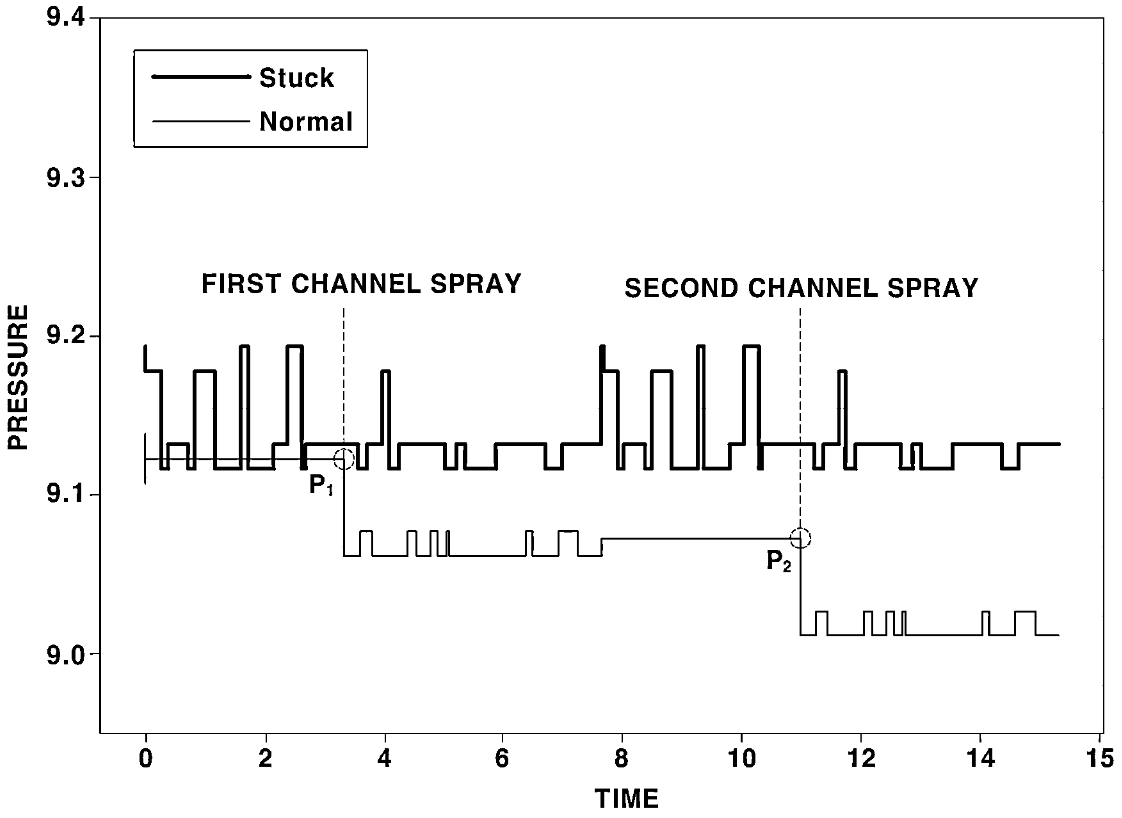
FIG. 4 is a chart illustrating a trend of a change in pressure when it is determined that a sensor cleaning system according to an embodiment of the present disclosure is stuck.

In other words, in a state in which the distributor 202, 302 is blocked and the compressor 1 is driven, it is common that pressures of the air tank 100, the roof module 200, and the rear bumper module 300 are consecutively increased as illustrated in FIG. 3A. In this case, when the pressures do not increase consecutively, it may be determined that a leak has occurred.

Therefore, in the present embodiment, the controller 500 may determine whether a leak according to the connection states of the first connector 10 through the fourth connector 40 occurs by using a difference in pressure between the air tank 100 and the rear bumper module 300, a difference in pressure between the roof module 200 and the rear bumper module 300, and a difference in pressure between the air tank 100 and the rear bumper module 300.

This is because, even though the distributor 202, 302 is blocked and the compressor 1 is driven, when a high voltage is not generated, it may be diagnosed that the sensor cleaning system is in a complete leak state. As a result, when the difference in the pressure is used, it is possible to correctly check a component in the complete leak state due to a ground defect of the connector.

To this end, the controller 500 first determines that a leak has occurred in the first connector 10 when it is determined that each difference in pressure occurring between the air tank 100 and the rear bumper module 300, between the roof module 200 and the rear bumper module 300, and between the air tank 100 and the roof module 200 is smaller than a set reference pressure difference.

Figure 3B:
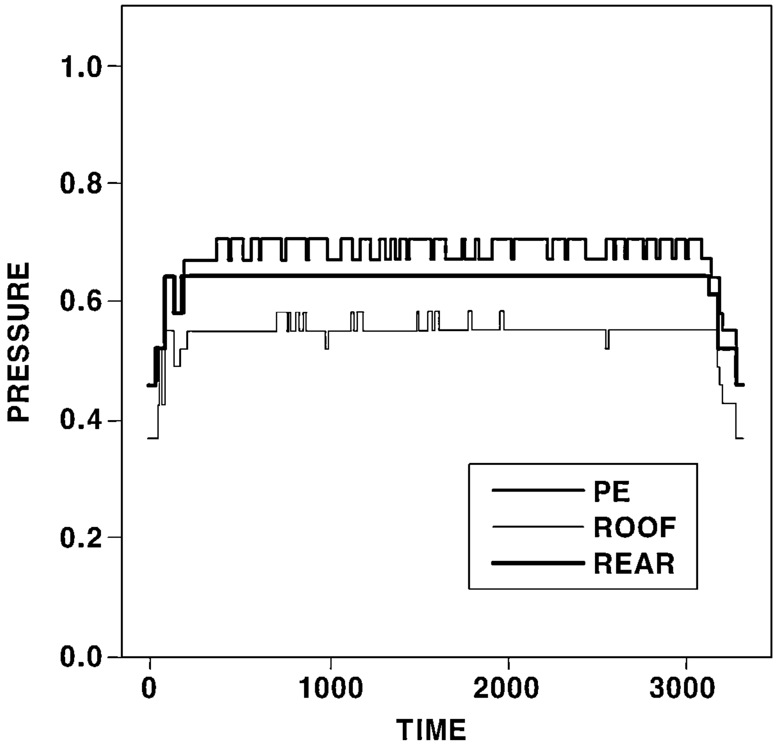

In other words, all of the three pressure values measured from the air tank 100, the roof module 200, and the rear bumper module 300 are, for example, between 0.5 and 0.7, as illustrated in FIG. 3B, and a difference thereof is ±0.01. Thus, it can be seen that the air supplied from the air tank 100 is distributed to the roof module 200 and the rear bumper module 300 without significant loss, and as a result, in this case, it may be determined that a leak has occurred in the first connector 10.

As described above, the reason for using the difference is essential because an error in an absolute voltage value may occur depending on connected power source/ground states. However, by relying on the difference, it may become possible to identify relative values between the sensors rather than the absolute values. This approach effectively resolves issues associated with errors that may occur.

The controller 500 may determine that the first connector 10 is normal, i.e., is not leaking or stuck, through the above method and determine that a leak occurs in the second connector 20 when it is determined that the difference in pressure between the air tank 100 and the rear bumper module 300 and the difference in pressure between the air tank 100 and the roof module 200 exceed the set reference pressure difference. Additionally, the controller 500 may determine that a leak occurs in the second connector 20 when it is determined that an absolute value of the difference in the pressure between the rear bumper module 300 and the roof module 200 is smaller than the set reference pressure difference.

Figure 3C:
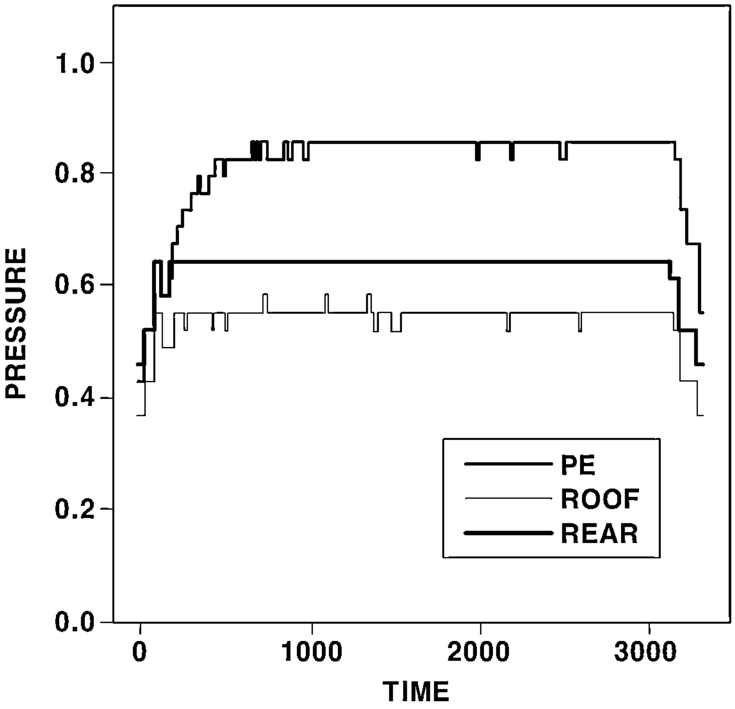

In other words, as illustrated in FIG. 3C, when a high pressure of 0.9, for example, is measured from the air tank 100 and a pressure difference between the rear bumper module 300 and the roof module 200 is low, there is no problem with the air distribution to the rear bumper module 300 and the roof module 200. However, if a substantial difference in pressure occurs between the air tank 100, the rear bumper module 300, and the roof module 200, it may be determined that a leak has occurred in the second connector 20 that is connected to a cowl crossbar.

The controller 500 may determine that the first connector 10 and the second connector 20 are sequentially normal and determine that a leak has occurred in the third connector 30 when it is determined that the pressure detected from the roof module 200 is relatively lower than the pressure detected from the rear bumper module 300.

Figure 3D:
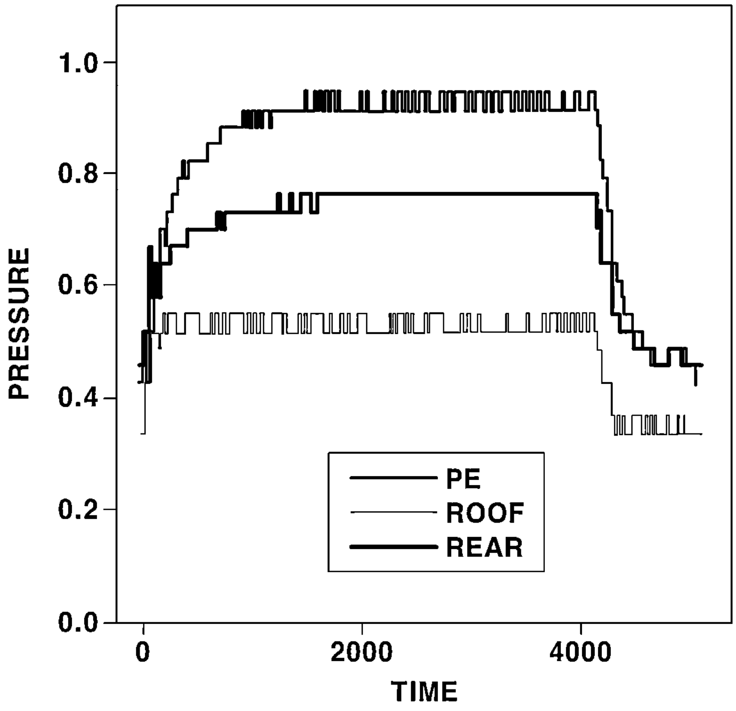

In other words, as illustrated in FIG. 3D, the pressure values of the air tank 100 and the rear bumper module 300 are slightly high, for example, 0.9 and 0.7, respectively. However, when the pressure value detected by the roof module 200 is relatively lower, specifically in relation to the same input pressure reference, it may be determined that a leak has occurred in the third connector 30, as only the pressure value detected from the roof module 200 is deemed low.

Figure 3E:
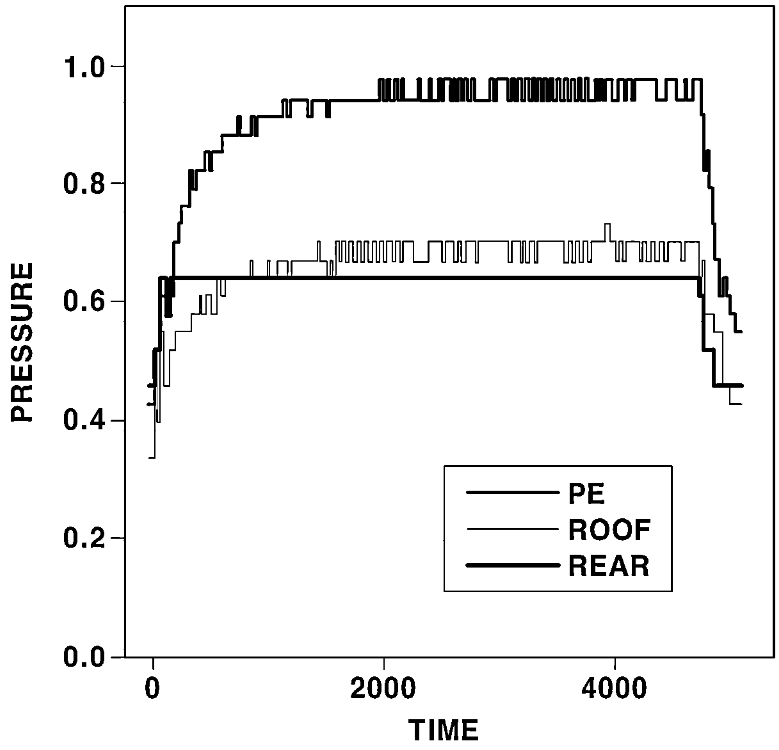

Likewise, as illustrated in FIG. 3E, the controller 500 may determine that the first connector 10, the second connector 20, and the third connector 30 are sequentially normal. However, when it is determined that the pressure detected from the roof module 200 is relatively higher than the pressure detected from the rear bumper module 300, when the first connector 10 to the third connector 30 are functioning normally, a low pressure value is detected from the rear bumper module 300. Thus, it may be determined that a leak has occurred in the fourth connector 40.

Therefore, in the present embodiment, since it is possible to correctly determine whether a leak occurs in the first connector 10 to the fourth connector 40 for connecting a plurality of components, it is possible to effectively diagnose a failure due to the leak.

As illustrated in FIG. 2, the sensor cleaning system according to the present embodiment further includes an outside air temperature sensor 600 configured to measure an outside air temperature of the vehicle and detect a change in outside air temperature.

More specifically, the controller 500 may determine that a fine leak has occurred when it is determined that the compressor 1 is driven a set number of times (e.g., 3 times or more) within a set time (e.g., 5 minutes), provided that the change in outside air temperature transmitted from the outside air temperature sensor 600 is within a set range (e.g., within 10 °C) and the distributor 202, 302 for allowing air to be distributed from the roof module 200 and the rear bumper module 300 is blocked.

Typically, the controller 500 controls the compressor 1 to be driven to prevent a drop in pressure. This is achieved when the drop in pressure occurs continuously due to the substantial change in outside air temperature, when the distributor 202, 302 is blocked and high-pressure air does not spray to the sensors.

Using this feature, when the distributor 202, 302 is blocked and the high-pressure air does not spray to the roof module 200 or the rear bumper module 300, and the compressor 1 is driven to prevent the drop in pressure even though the change in outside air temperature is smaller than the set range, it may be determined that the drop in pressure occurs continuously. Thus, the position of the fine leak may not be determined, but it may be diagnosed whether the fine leak occurs on the air flow path(s).

Therefore, the controller 500 finally diagnoses the occurrence of the fine leak when the change in outside air temperature transmitted from the outside air temperature sensor 600 is within 10 °C, and the operation of the compressor 1 is driven 3 times or more within 5 minutes when the distributor 202, 302 is blocked.

In addition, the controller 500 may diagnose that the air flow path, i.e., a spray nozzle connected to the rear bumper module 300 or the roof module 200 is in a stuck state when it is determined that the drop in pressure is not detected from the pressure sensor 400 at the distributed position after the air is distributed to the rear bumper module 300 and the roof module 200.

The diagnosis of the controller 500 may be misdiagnosed by a change in pressure caused by vehicle driving or movement. Thus, the diagnosis performed by the controller 500 is desired to be performed in a stopped state of the vehicle. In addition, the controller 500 determines the change in pressures of both the rear bumper module 300 and the roof module 200. For example, the controller 500 sequentially determines 21 channels connected to the distributor 202, 302 for allowing air to be distributed from the rear bumper module 300 and the roof module 200 to individually diagnose the stuck states of all the spray nozzles connected to the sensors.

Describing the roof module 200 as an example, as illustrated in FIG. 4, the controller 500 allows air to consecutively spray to the corresponding sensor through a first channel and a second channel of the roof module 200 connected to the distributor 202, 302 (P1 and P2). When it is determined that a change in spray pressure occurs, i.e., P1 and P2 is smaller than a set critical value, and there is no drop in pressure even though spraying is initiated, it may be diagnosed that the corresponding spray nozzle is stuck.

The continuing pressure measurement between the plurality of channels for determining the change in pressure is controlled to be performed after a set idle time has elapsed.

In other words, when the stuck state of the first channel is diagnosed and the stuck state of the second channel is diagnosed without the idle time, since the possibility of the occurrence of misdiagnosis due to the stuck state diagnosis of the first channel is present, the measurement may be controlled to be performed after the idle time has elapsed by the controller 500.

For example, as illustrated in FIG. 4, when the idle time is controlled to be present up to a time point P2 at which air sprays to the second channel after a time point P1 at which the air sprays to the first channel, since it can be confirmed that a change in pressure does not occur between about 7.9 seconds and 10.4 seconds, it is possible to prevent the misdiagnosis due to the change in pressure through the idle time as described above and individually diagnose the stuck states of all the air flow paths.

Figure 5:
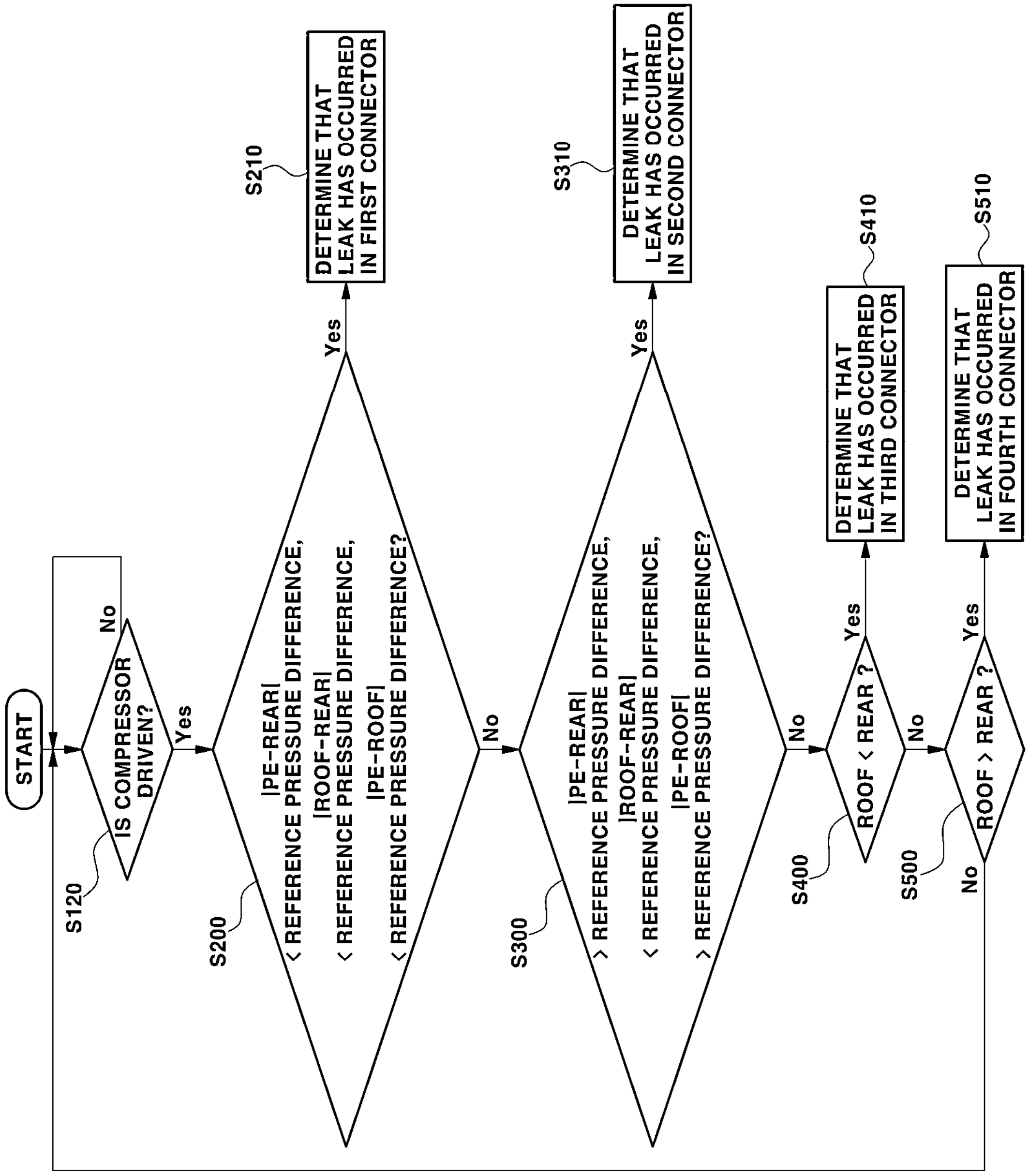
FIG. 5 is a block diagram sequentially illustrating an embodiment of a method of diagnosing a failure of a sensor cleaning system according to the present disclosure.
Figure 6:
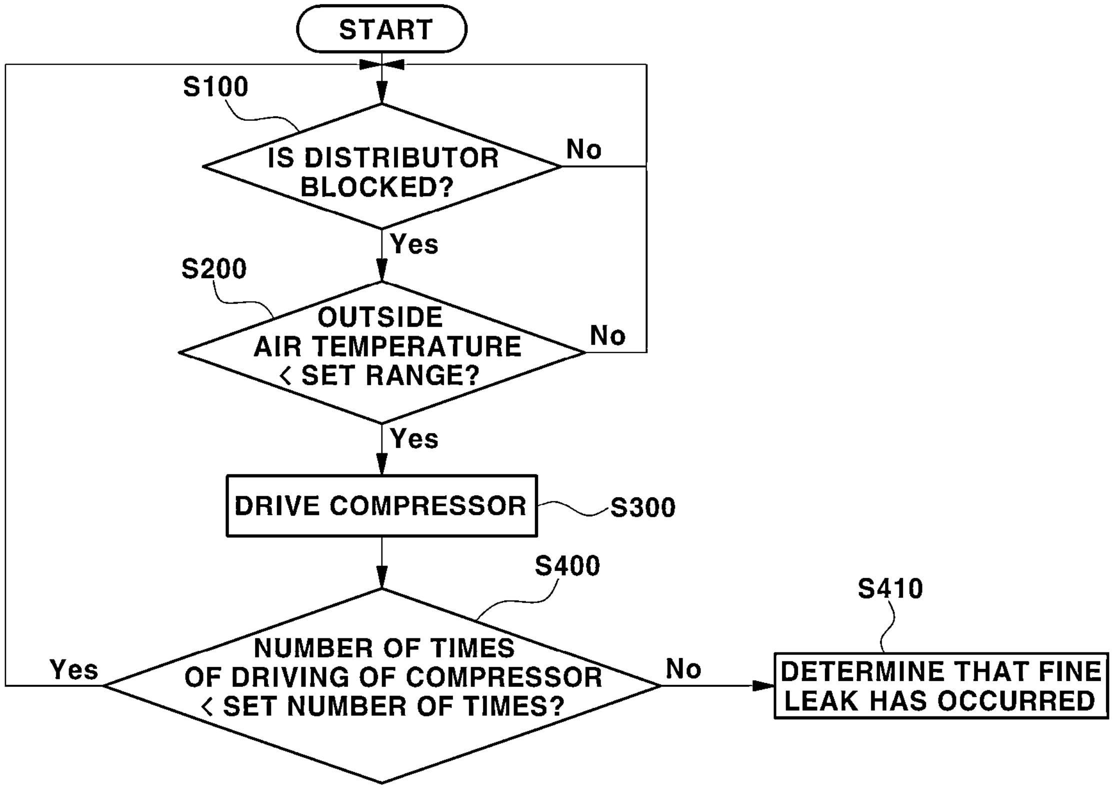
FIG. 6 is a block diagram sequentially illustrating another embodiment of a method of diagnosing a failure of a sensor cleaning system according to the present disclosure.
Figure 7:
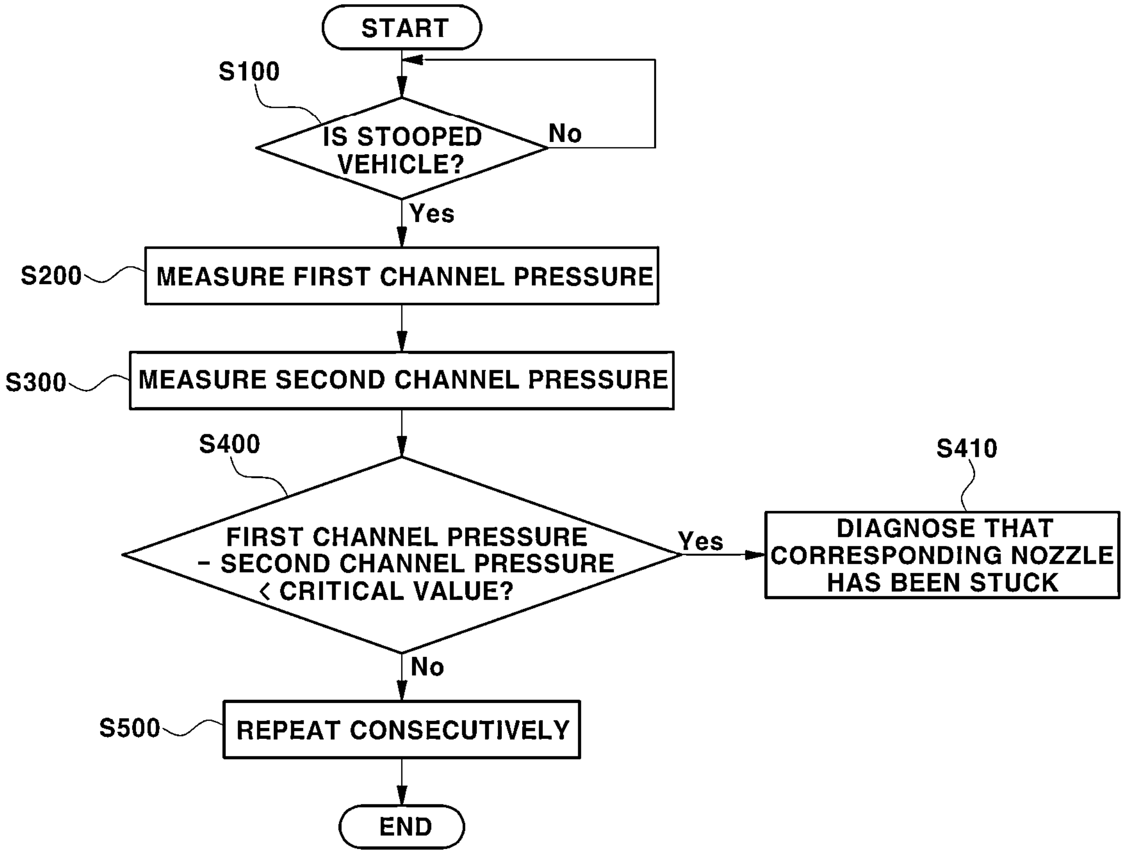
FIG. 7 is a block diagram sequentially illustrating another embodiment of a method of diagnosing a failure of a sensor cleaning system according to the present disclosure.

Hereinafter, FIG. 5 is a view sequentially illustrating an embodiment of a method of diagnosing a failure of the sensor cleaning system according to an embodiment of the present disclosure. FIG. 6 is a view sequentially illustrating another embodiment of a method of diagnosing a failure of a sensor cleaning system according to an embodiment of the present disclosure. FIG. 7 is a view sequentially illustrating another embodiment of a method of diagnosing a failure of a sensor cleaning system according to an embodiment of the present disclosure.

As illustrated in FIG. 5, a method of diagnosing a failure of the sensor cleaning system according to the present embodiment is sequentially described as follows.

When the distributor 202, 302 connected to the plurality of sensors is blocked and the compressor 1 is driven, it is normal that the pressures of the air tank 100, the roof module 200, and the rear bumper module 300 are increased consecutively (see FIG. 3A). When the pressures are not increased consecutively, it may be determined that a complete leak has occurred.

As described above, in order to determine whether the complete leak occurs, the controller 500 first determines whether the compressor 1 is driven (S100).

In this case, the controller 500 may determine whether a leak according to the connection states of the first connector 10 to the fourth connector 40 occurs by using the difference in pressure between the air tank 100 and the rear bumper module 300, the difference in pressure between the roof module 200 and the rear bumper module 300, and the difference in pressure between the air tank 100 and the rear bumper module 300.

This is because even though the distributor 202, 302 is blocked and the compressor 1 is driven, when a high voltage is not generated, it may be diagnosed that the sensor cleaning system is in a complete leak state. Thus, when the difference in the pressure is used, it is possible to correctly check a component in the complete leak state due to a ground defect of the connector.

To this end, the controller 500 determines that a leak has occurred in the first connector 10 when it is determined that the difference in pressures occurring between the air tank 100 and the rear bumper module 300, between the roof module 200 and the rear bumper module 300, and between the air tank 100 and the roof module 200 are each smaller than the set reference pressure difference (S210).

In other words, all of the three pressure values measured from the air tank 100, the roof module 200, and the rear bumper module 300 are, for example, between 0.5 and 0.7, as illustrated in FIG. 3B, and a difference thereof is ±0.01. Thus, it can be seen that the air supplied from the air tank 100 is distributed to the roof module 200 and the rear bumper module 300 without significant loss, and as a result, it may be determined that a leak has occurred in the first connector 10.

As described above, the reason for using the difference is that the method for detecting the pressure involves a voltage value and an error in an absolute value itself of a voltage may occur depending on connected power source/ground states. However, since the difference may be used to identify relative values between the sensors rather than the absolute value, a problem due to the occurrence of the error can be solved.

The controller 500 may determine that the first connector 10 is normal through the above method and determine that a leak has occurred in the second connector 20 when it is determined that the difference in pressure between the air tank 100 and the rear bumper module 300 and the difference in pressure between the air tank 100 and the roof module 200, exceed the set reference pressure difference. Additionally, the controller 500 may determine that a leak has occurred in the second connector 20 when an absolute value of the difference in pressure between the rear bumper module 300 and the roof module 200 is smaller than the set reference pressure difference (S310).

In other words, when a high pressure of 0.9, for example, is measured from the air tank 100 (see FIG. 3C) and the pressure difference between the rear bumper module 300 and the roof module 200 is low, there is no problem with the air distribution to the rear bumper module 300 and the roof module 200. Alternatively, it may be determined that a leak has occurred between the air tank 100, the rear bumper module 300, and the roof module 200 in which a great difference in the pressure occurs. Thus, it may be determined that a leak has occurred in the second connector 20 connected to the cowl crossbar.

The controller 500 may determine that the first connector 10 and the second connector 20 are sequentially normal (S200 and S300) and determine that a leak has occurred in the third connector 30 (S410) when it is determined that the pressure detected from the roof module 200 is relatively lower than the pressure detected from the rear bumper module 300 (S400).

In other words, the pressure values of the air tank 100 and the rear bumper module 300 are slightly high, for example, 0.9 and 0.7, respectively (see FIG. 3D). In cases when the pressure value detected by the roof module 200 is relatively lower, specifically in relation to the same input pressure reference, it may be determined that a leak has occurred in the third connector 30, as only the pressure value detected from the roof module 200 is deemed low.

Likewise, referring to FIG. 3E, the controller 500 may determine that the first connector 10, the second connector 20, and the third connector 30 are sequentially normal (S200 to S400). However, when it is determined that the pressure detected from the roof module 200 is relatively higher than the pressure detected from the rear bumper module 300 (S500), when the first connector 10 to the third connector 30 are functioning normally, a low pressure value is detected from the rear bumper module 300. Thus, it may be determined that a leak has occurred in the fourth connector 40 (S510).

As illustrated in FIG. 6, in the method of diagnosing the failure of the sensor cleaning system according to the present embodiment, it may be determined that a fine leak has occurred (S410) when it is determined that the change in outside air temperature transmitted from the outside air temperature sensor 600 is within the set range, e.g., 10 °C (S200). Additionally, it may be determined that a fine leak has occurred (S410) when the compressor 1 is driven (S300) a set number of times (e.g., 3 times) or more within a set time (e.g., 5 minutes) (S400) by the controller 500 when the distributor 202, 302 for allowing the air to be distributed from the roof module 200 and the rear bumper module 300 is blocked (S100).

Typically, the controller 500 controls the compressor 1 to be driven to prevent a drop in pressure because the drop in pressure occurs continuously when the change in outside air temperature is great when the distributor 202, 302 is blocked and high-pressure air does not spray to the sensors.

Using this feature, when the distributor 202, 302 is blocked, the high-pressure air does not spray to the roof module 200 or the rear bumper module 300 (S100), and the compressor 1 is driven to prevent the drop in pressure (S300 to S400) even though the change in outside air temperature is smaller than the set range (S200), it may be determined that the drop in pressure occurs continuously. Thus, the position of the fine leak may not be specified, but it may be diagnosed whether the fine leak occurs on the air flow path(s) (S410).

Therefore, the controller 500 finally diagnoses the occurrence of the fine leak when the change in outside air temperature transmitted from the outside air temperature sensor 600 is within 10 °C and the operation of the compressor 1 is driven 3 times or more within 5 minutes. This diagnosis occurs when the distributor 202, 302 is blocked.

As illustrated in FIG. 7, after the air is distributed to the rear bumper module 300 and the roof module 200, when it is determined that the drop in pressure is not detected from the pressure sensor 400 at the distributed position (see FIG. 4), the controller 500 may diagnose that the air flow path, i.e., the spray nozzle connected to the rear bumper module 300 or the roof module 200 is in the stuck state.

Since the diagnosis of the controller 500 may be misdiagnosed by the change in pressure caused by the vehicle traveling, it is first determined whether the vehicle is in a stopped state (S100).

When it is determined that the vehicle is in the stopped state (S100), air consecutively sprays to the corresponding sensor through the first channel and the second channel connected to the distributor 202, 302 in order to diagnose a stuck state (S200 and S300).

When it is determined that the change in pressure between the consecutively measured first and second channels, i.e., the time points P1 and P2 in FIG. 4, is smaller than the set critical value (S400), the controller 500 may diagnose that the corresponding spray nozzle has been stuck (S410).

In other words, when the air consecutively sprays through the first and second channels connected to the distributor 202, 302, in a normal state, the change in spray pressure between the time points P1 and P2 should exceed the set critical value, i.e., a drop in pressure should occur. However, in the stuck state, the change in the pressure between the time points P1 and P2 becomes smaller than the set critical value (see FIG. 4).

Therefore, when a drop in pressure does not occur even though the air sprays to the first and second channels are connected to the distributor 202, 302, it may be diagnosed that the spray nozzle has been stuck.

The controller 500 determines all changes in pressures of the rear bumper module 300 and the roof module 200. Specifically, the controller 500 sequentially determines all the changes in pressure in 21 channels, i.e., the consecutive channels such as the third channel and the fourth channel connected to the distributor 202, 302 for allowing the air to be distributed from the rear bumper module 300 and the roof module 200. This sequential examination facilitates the individual diagnosis of the stuck states of all the spray nozzles connected to the sensors (S500).

The continuing pressure measurement between the plurality of channels for determining the change in pressure is controlled to be performed after a set idle time has elapsed.

In other words, when the stuck state of the first channel is diagnosed and the stuck state of the second channel is diagnosed without the idle time, since the possibility of the occurrence of misdiagnosis due to the stuck state diagnosis of the first channel is present, the measurement may be controlled to be performed after the idle time has elapsed by the controller 500.

For example, when the idle time is controlled to be present up to the time point P2 at which air sprays to the second channel after the time point P1 at which the air sprays to the first channel, it can be confirmed that a change in pressure does not occur between about 7.9 seconds and 10.4 seconds (see FIG. 4). This measurement helps prevent the misdiagnosis due to the change in pressure through the idle time as described above, ensuring accurate individual diagnosis of the stuck states of all the air flow paths.

According to the present disclosure, it is possible to correctly diagnose the position of the occurrence of the failure such as a leak by checking the connection state of each of the air tank, the rear bumper module, and the roof module to the connector. This is achieved by using the differences in the pressures detected from the mounted pressure sensors when the compressor is driven. The presence or absence of a leak is diagnosed by employing the pressure sensors on each of the air tank, the rear bumper module, and the roof module, with high-pressure air supplied from the air tank to be distributed to the rear bumper module and the roof module to perform cleaning.

In addition, according to the present disclosure, even though the outside air temperature is not changed and the high-pressure cleaning air is not distributed, when the compressor is operated to maintain the internal pressure to be the set minimum pressure or higher, it may be diagnosed that a fine leak has occurred. As a result, it is possible to effectively determine whether the fine leak occurs.

In addition, according to the present disclosure, after the cleaning air is distributed to the rear bumper module and the roof module, when it is determined that a drop in pressure has not been detected from the pressure sensor, it may be determined that the spray nozzle connected to the rear bumper module and the roof module is in the stuck state, and thus it is possible to diagnose the presence or absence of the stuck state.

The present disclosure has been described above with reference to the embodiment(s) illustrated in the drawings. However, it should be understood that this is only illustrative, and various modifications can be made from the present disclosure by those having ordinary skill in the art. All or some of the above-described embodiment(s) may also be configured in selective combination thereof. Therefore, the true technical scope of the present disclosure should be determined by the technical spirit of the appended claims.

What is claimed is:

1. A sensor cleaning system comprising:
- an air tank connected to a compressor through a first connector and configured to be filled with high-pressure air by the compressor;
- a roof module;
- a rear bumper module;
- an air flow path connected to the air tank and being branched by a second connector to a first branched air flow path and to a second branched air flow path, wherein the first branched air flow path is connected through a third connector to the roof module and the second branched air flow path is connected through a fourth connector to the rear bumper module;
- a pressure sensor installed on and configured to measure pressure of each of the air tank, the roof module, and the rear bumper module;
- a distributor configured to selectively perform individual cleaning by spraying air to a plurality of sensors through a plurality of channels respectively connected to the roof module and the rear bumper module; and
- a controller configured to
  - control the distributor to be blocked,
  - control the compressor to be driven, and
  - determine connection states of the first connector, the second connector, the third connector, and the fourth connector through a difference in pressure between the air tank, and the rear bumper module, a difference in pressure between the roof module and the rear bumper module, and a difference in pressure between the air tank and the roof module, in a state in which the distributor is blocked and the compressor is driven.

2. The sensor cleaning system of claim 1, wherein the controller is further configured to determine whether a leak according to the connection states of the first connector to the fourth connector occurs by using a difference in pressures between the air tank and the rear bumper module, between the roof module and the rear bumper module, and between the air tank and the rear bumper module when it is determined that a pressure is not consecutively increased in a state of the compressor being driven.

3. The sensor cleaning system of claim 2, wherein the controller is further configured to determine that a leak has occurred in the first connector when it is determined that each difference in pressure between the air tank and the rear bumper module, between the roof module and the rear bumper module, and between the air tank and the roof module is smaller than a set reference pressure difference.

4. The sensor cleaning system of claim 2, wherein the controller is further configured to determine that a leak has occurred in the second connector when it is determined that: i) the first connector is not leaking or stuck; ii) a difference in pressure between the air tank and the rear bumper module and a difference in pressure between the air tank and the roof module exceed a set reference pressure difference; and iii) an absolute value of the difference in pressure between the rear bumper module and the roof module is smaller than the set reference pressure difference.

5. The sensor cleaning system of claim 2, wherein the controller is further configured to:
- determine that a leak has occurred in the third connector when it is determined that the first connector and the second connector are not leaking or stuck and that a pressure detected from the roof module is lower than a pressure detected from the rear bumper module; and
- determine that a leak has occurred in the fourth connector when it is determined that the pressure detected from the roof module is higher than the pressure detected from the rear bumper module.

6. The sensor cleaning system of claim 1, further comprising an outside air temperature sensor configured to measure an outside air temperature of a vehicle and to detect a change in the outside air temperature.

7. The sensor cleaning system of claim 6, wherein the controller is configured to determine that a fine leak has occurred when it is determined that the change in outside air temperature transmitted from the outside air temperature sensor is within a set range and the compressor is driven a set number of times or more within a set time when a distributor configured to allow air to be distributed from the roof module and the rear bumper module is blocked.

8. The sensor cleaning system of claim 1, wherein the controller is configured to determine that the first and second branched air flow paths respectively connected to the roof module and the rear bumper module are in a stuck state when it is determined that a drop in pressure is not detected from the pressure sensors after air is distributed to the roof module and the rear bumper module.

9. The sensor cleaning system of claim 8, wherein the controller is configured to determine all changes in pressures of the rear bumper module and the roof module and to individually diagnose stuck states of all the first and second branched air flow paths connected to the roof module and the rear bumper module.

10. The sensor cleaning system of claim 9, wherein the controller is configured to:
- determine that the first and second branched air flow paths are in the stuck state when it is determined that the measured change in pressure between the rear bumper module and the roof module is smaller than a set critical value; and
- control the pressure sensors to measure the pressures of the rear bumper module and the roof module for determining the change in pressure to be performed after a set idle time has elapsed.

11. A method of diagnosing a failure of a sensor cleaning system, the method comprising:
- a first operation of controlling, by a controller, a distributor to be blocked, the distributor configured to allow air to be distributed from a roof module and a rear bumper module, controlling, by the controller, a compressor to be driven, and determining, by the controller, whether the compressor is driven; and a second operation of determining, by the controller, a leak of a first connector, a second connector, a third connector, or a fourth connector installed in air flow paths connecting an air tank, a cowl crossbar, a roof module, and a rear bumper module through a difference in pressure between the air tank and the rear bumper module, a difference in pressure between the roof module and the rear bumper module, and a difference in pressure between the air tank and the roof module, measured by a pressure sensor, when it is determined that a pressure is not consecutively increased in a state in which the distributor is blocked and the compressor is driven.

12. The method of claim 11, wherein the second operation includes:

determining that a leak has occurred in the first connector when it is determined that each difference in pressure between the air tank and the rear bumper module, between the roof module and the rear bumper module, and between the air tank and the roof module is smaller than a set reference pressure difference.

13. The method of claim 11, wherein the second operation includes:

determining that a leak has occurred in the second connector when it is determined that: i) the first connector is not leaking or stuck; ii) that a difference in pressure between the air tank and the rear bumper module and a difference in pressure between the air tank and the roof module exceed a set reference pressure difference; and iii) an absolute value of the difference in pressure between the rear bumper module and the roof module is smaller than the set reference pressure difference.

14. The method of claim 11, wherein the second operation includes:

determining that a leak has occurred in the third connector when it is determined that the first connector and the second connector are not leaking or stuck normal and that a pressure detected from the roof module is lower than a pressure detected from the rear bumper module; and determining that a leak has occurred in the fourth connector when it is determined that the pressure detected from the roof module is higher than the pressure detected from the rear bumper module.

15. The method of claim 11, wherein the second operation includes determining that a leak has occurred when it is determined that: i) a change in outside air temperature transmitted from an outside air temperature sensor is within a set range; and ii) the compressor is driven a set number of times or more within a set time when a distributor configured to allow air to be distributed from the roof module and the rear bumper module is blocked.

* * * * *